(12) United States Patent
Hillman et al.

(10) Patent No.: US 10,625,896 B2
(45) Date of Patent: Apr. 21, 2020

(54) DECAL MARKER SYSTEM

(71) Applicant: AKRON SPECIAL MACHINERY, INC., Akron, OH (US)

(72) Inventors: Benjamin E. Hillman, Canton, OH (US); Charles A. Lint, Massillon, OH (US); Brian D. Mitchell, Akron, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 0 days.

(21) Appl. No.: 15/909,199

(22) Filed: Mar. 1, 2018

(65) Prior Publication Data
US 2019/0270535 A1    Sep. 5, 2019

(51) Int. Cl.
| | |
|---|---|
| *B65C 9/18* | (2006.01) |
| *B60C 13/00* | (2006.01) |
| *B32B 38/18* | (2006.01) |
| *B65H 18/10* | (2006.01) |
| *G01M 1/26* | (2006.01) |
| *G01M 17/02* | (2006.01) |
| *B29D 30/72* | (2006.01) |
| *B29C 37/00* | (2006.01) |
| *B29C 65/00* | (2006.01) |

(52) U.S. Cl.
CPC ............ *B65C 9/1873* (2013.01); *B29C 66/90* (2013.01); *B29C 66/93* (2013.01); *B29D 30/72* (2013.01); *B32B 38/1833* (2013.01); *B60C 13/00* (2013.01); *B65H 18/103* (2013.01); *G01M 1/26* (2013.01); *G01M 17/024* (2013.01); *B29C 2037/80* (2013.01); *B29D 2030/726* (2013.01); *B29D 2030/728* (2013.01)

(58) Field of Classification Search
CPC ............................. B65C 9/1873; B29D 30/72; B29D 2030/726; B29D 2030/728; B32B 38/1833; B29C 2037/80; B29C 66/90; B29C 66/93; B60C 13/00; B65H 18/103; G01M 1/26; G01M 17/024
USPC ......................................... 156/350, 351, 443
See application file for complete search history.

(56) References Cited

U.S. PATENT DOCUMENTS

| | | | |
|---|---|---|---|
| 3,631,716 A | 1/1972 | Monajjem | ........................ 73/146 |
| 4,397,710 A | 8/1983 | Gaylord | ........................ 156/475 |

(Continued)

FOREIGN PATENT DOCUMENTS

| | | | | |
|---|---|---|---|---|
| EP | 0604819 A2 * | 7/1994 | ......... | B29C 37/0025 |
| WO | WO 2018/057865 A1 | 3/2018 | ................ | B41J 2/00 |

OTHER PUBLICATIONS

International Search Report dated Apr. 30, 2019 in related application No. PCT/US2019/019505.

(Continued)

*Primary Examiner* — Sonya M Sengupta
(74) *Attorney, Agent, or Firm* — Renner Kenner Greive Bobak Taylor & Weber (57) ABSTRACT

A decal marker used with a marking station interchangeably carries a decal tape and a marking tape and transfers a decal from the decal tape to a surface to be marked. A marking assembly frame and at least one marker carried by the marking assembly frame which carries the decal tape or the marking tape are included. A tape sensor assembly is carried by the at least one marker and detects an edge of the decal so that the at least one marker properly positions the decal for transfer to the surface.

15 Claims, 6 Drawing Sheets

(56) References Cited

U.S. PATENT DOCUMENTS

| | | | |
|---|---|---|---|
| 6,221,453 B1 | 4/2001 | Majumdar | 428/40.2 |
| 6,439,042 B1 | 8/2002 | Delmoro et al. | 73/146 |
| 2002/0005123 A1* | 1/2002 | Wada | B41F 16/008 |
| | | | 101/33 |
| 2012/0298286 A1* | 11/2012 | Matuszny | B29D 30/0061 |
| | | | 156/64 |
| 2013/0335502 A1* | 12/2013 | Wakazono | B41J 2/325 |
| | | | 347/222 |

OTHER PUBLICATIONS

Written Opinion dated Apr. 30, 2019 in related application No. PCT/US2019/019505.

* cited by examiner

DECAL MARKER SYSTEM

TECHNICAL FIELD

The present invention generally relates to a decal marker system used with tire uniformity machines. More particularly, the present invention relates to a marking mechanism for a tire uniformity machine. Most specifically, the present invention relates to a system for automatically positioning a decal mark on a tire in a continuous process.

BACKGROUND ART

Tire uniformity machines may be used to detect the high or low point of fundamental harmonic of radial and lateral force variations within a tire. When measuring the tire force variations, a computer analyzes the high or low point angle of the radial and lateral force variations first harmonic from an event mark (zero angle). The event mark is set on the tire spindle shaft in conjunction with a pulse generator and pulses once per revolution. After measurement is complete, the high or low point of the tire is indexed and stopped beneath a marker head. A heated marking pin is lowered against the upper side wall of the inflated tire by actuation of an air cylinder. The heated pin transfers pigment or metal foil from a tape to place a mark on the sidewalls of the tire at the high or low point.

The above described marking system is effective if a conventional marking tape is used. Such a tape has a backing membrane that faces the heated pin and a marking material that faces the tire. When actuated, the pin presses the marking material adjacent the tire surface, and the applied heat and pressure transfers the marking material to the tire. This is sufficient for when the marking material is continuous on the membrane. However, the marking material sometimes does not meet the tire manufacturing requirements. In particular, the marking material may not clearly mark the tire, or the marking material does not last long enough to convey the desired information.

In place of a continuous marking material on a membrane, decal type markers may be used. However, such decals, which are more substantive and last longer than pigment or foil type marks, also present their own particular problems. The decals may become misaligned with the striking pin as the membrane is sequenced through the marking assembly. As a result, the striking pin may not fully engage the marking decal, and as a result, only a portion of the decal is applied to the tire. Therefore, there is a need for a decal marking system to accurately coordinate the position of the decal with the marking pin so that the decal is uniformly applied to the tire.

SUMMARY OF THE INVENTION

In light of the foregoing, it is a first aspect of the present invention to provide a decal marker system.

It is another aspect of the present invention to provide a decal marker used with a tire uniformity marking station which carries a decal tape, wherein the decal marker transfers a decal from the decal tape to a surface of the tire, comprising a marking assembly frame movable between a retracted position and a marking position, a marker carried by the marking assembly frame, wherein the marker carries the decal tape, and a tape sensor assembly carried by the marker to detect an edge of the decal so that the marker properly positions the decal for transfer to the surface.

Yet another aspect of the present invention is to provide a decal marker used with a marking station which interchangeably carries a decal tape and a marking tape, wherein the decal marker transfers a decal from the decal tape to a surface to be marked, comprising a marking assembly frame, at least one marker carried by the marking assembly frame, wherein the at least one marker carries the decal tape or the marking tape, and a tape sensor assembly carried by the at least one marker to detect an edge of the decal so that the at least one marker properly positions the decal for transfer to the surface.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

A marking station according to the present invention is designated generally by the numeral 10 in the accompanying drawings. The marking station 10 is typically associated with a tire uniformity machine and is utilized for the purpose of marking an object, such as a tire, after the object has been tested for certain operational parameters. In the example of a tire, the tire uniformity machine determines whether the tire tread exceeds certain dimensional parameters and whether the tire should be marked as being acceptable or not acceptable; or in some instances a certain grade or quality of the tire will be determined by the test and then associated with an identifying mark. The marking station 10 is typically downstream of the tire uniformity machine, in that after the tire is tested it is passed along to the marking station for appropriate marking according to the test results. In some instances, the marking station may be integrated within the tire uniformity machine to mark the tire while it is chucked.

Figure 1:
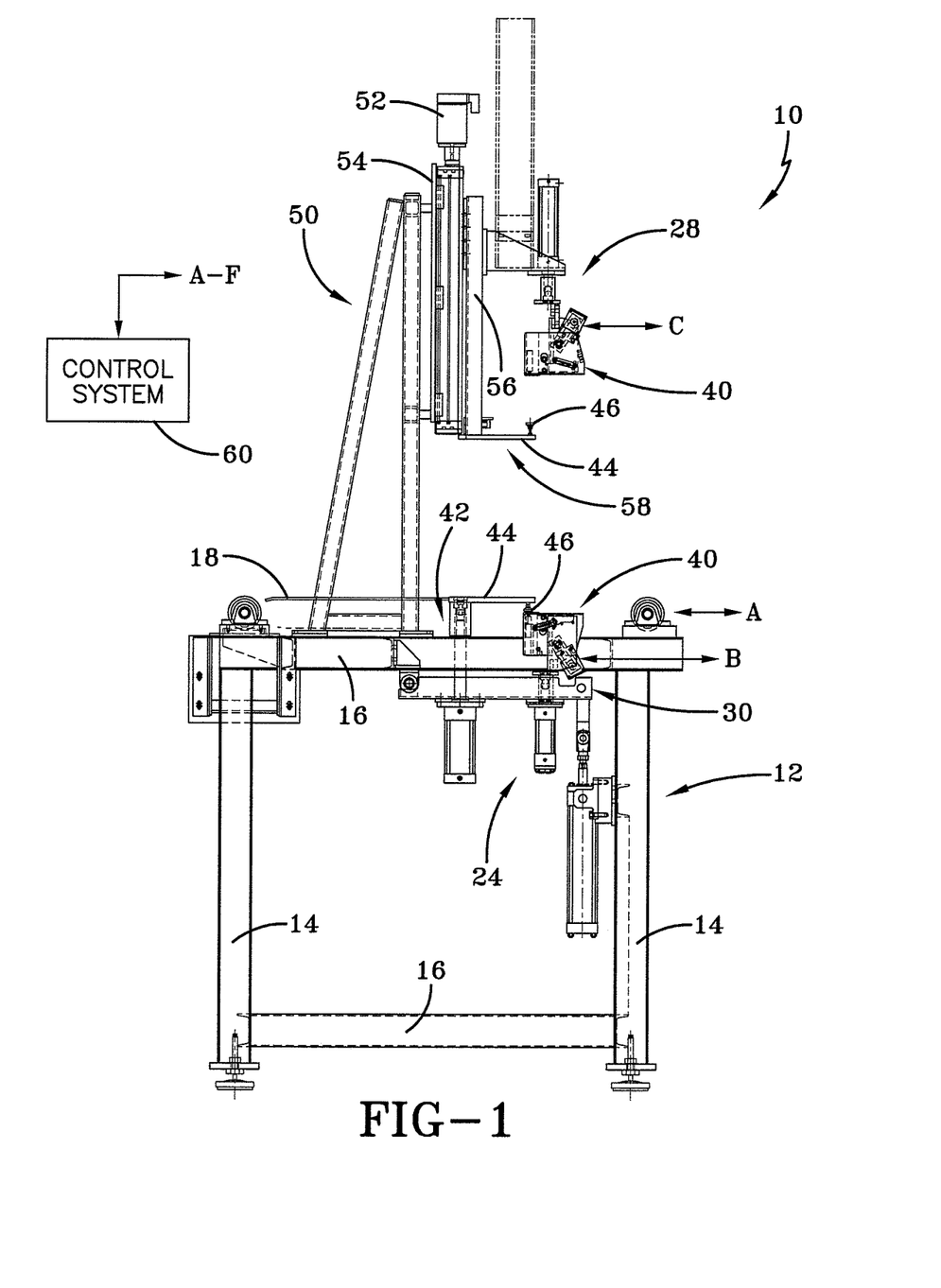
FIG. 1 is a side elevational view of a marking station according to the concepts of the present invention.
Figure 2:
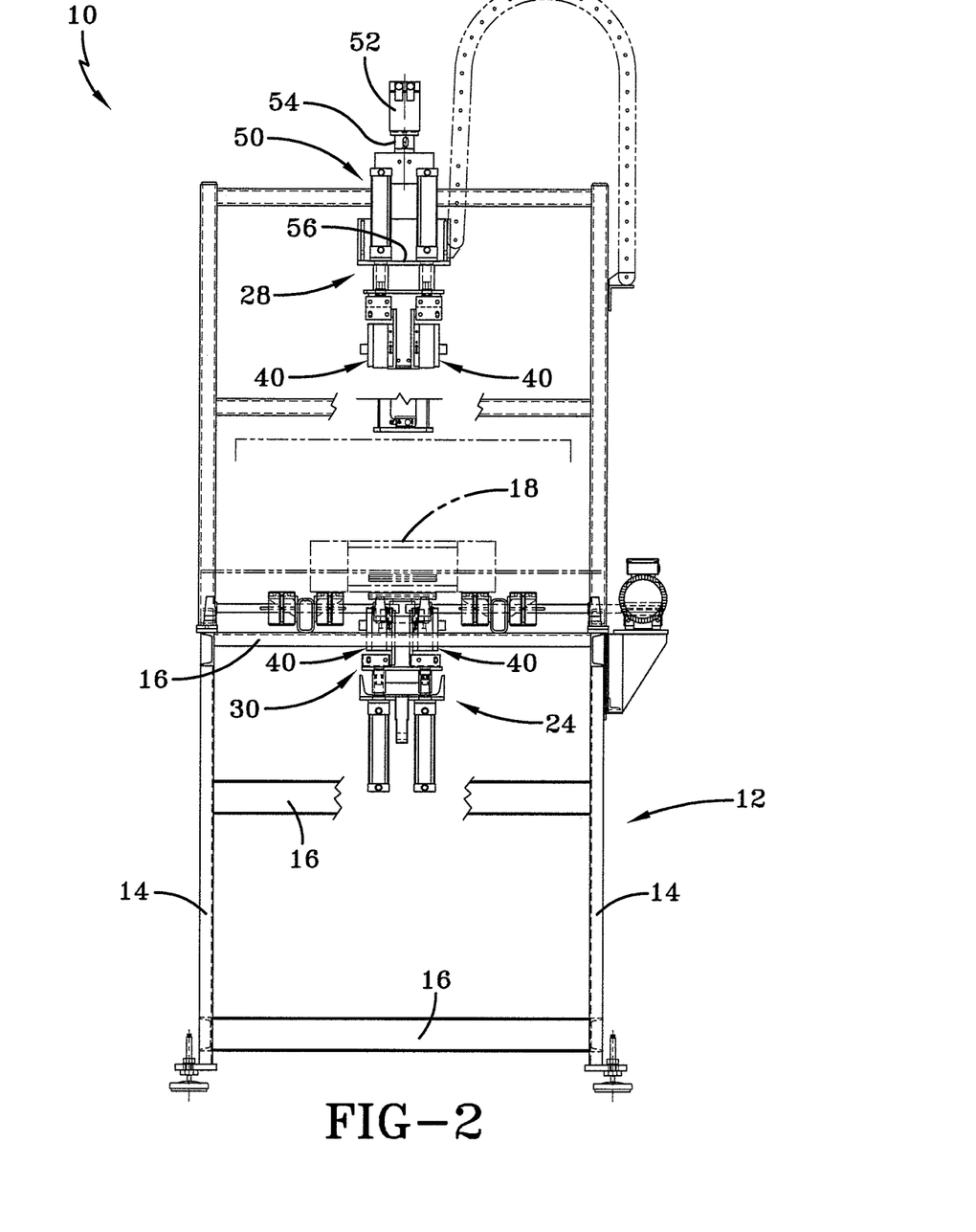
FIG. 2 is a front elevational view of the marking station according to the concepts of the present invention.

The marking station includes a frame 12 which comprises a plurality of posts 14 and associated crossbeams 16 which provide structural rigidity to the frame 12. A conveyor 18, which is typically motor driven, is supported by the frame 12, wherein the motor associated with the conveyor is operated by a control signal A.

The marking station includes a lower marking assembly 24 which is maintained underneath the conveyor 18 and an upper marking assembly 28 which is maintained above the frame 12 and the conveyor 18. The lower marking assembly 24 is utilized to mark a sidewall of the tested tire closest to the conveyor while the upper marking assembly 28 is utilized to mark the other sidewall of the tested tire. Either or both of the marking assemblies 24 and 28 may be utilized depending upon the end use marking requirements of the manufacturer.

The lower marking assembly 24 is operated utilizing a control signal B which may include several signals directed to the various motors and actuators which move the marking assembly in relation to the frame so as to move the components of the assembly into a marking position and back to a retracted position. The lower marking assembly 24 may include a marking position structure 30 which is movable between the retracted position and a marking position. The structure 30 carries a marker 40 which, as will be discussed, carries marking material to mark the tire sidewall or other surface to be marked. In the present embodiment, the assembly 24 carries two markers, although one or any other number of markers may be employed as needed. Associated with the marker positioning structure 30 is a marker support structure 42 which may be near the position of the positioning structure 30 and which provides a support arm 44 which extends into the tire between the tire sidewalls and wherein a support button 46 is provided at the end of the support arm 44. The support arm 44 and associated button 46 is moved into position so as to support the tire sidewall in the marking area during the marking operation.

An upper marking assembly 28 is operated utilizing a control signal C which may include several signals directed to the various motors and actuators associated with the assembly. The upper marking assembly 28 includes an assembly frame 50 which is associated with a motor 52. The frame includes an arm 54 which carries a linearly moving table 56 that moves the arm with respect to the frame 50. The table carries at least one marker 40, which may be substantially the same as the markers carried by the lower marking assembly 24. In the present embodiment two markers 40 are employed, although skilled artisans will appreciate that a single marker or multiple markers may be carried by the frame 50. The assembly 28 also includes a marker support structure 58 which is attached to the frame 50 and which includes a support arm 44 from which extends a support button 46 which serves the same purpose as the support arm and support button carried by the lower marking assembly 24.

As will become apparent as the description proceeds, the marker 40 disclosed herein is used primarily for applying a decal to the tire surface or other surface as appropriate. However, the marker may also be a stamp marker 40' which may be similar to the one shown in U.S. Pat. No. 6,439,042, which is incorporated herein by reference. The decal marker 40 includes many of the same components as the stamp marker 40'; however, certain components are utilized for the specific purpose of properly placing a decal from the decal marking tape in a proper position before the marking operation takes place as will be described.

A control system 60 is associated with the marking station 10 and, in particular: the conveyor 18, the components of the lower marking assembly 24 and the upper marking assembly 28, and all of their associated markers 40 and 40'. The control system 60 maintains the necessary hardware, software and memory to receive and send control signals A-F to the components of the marking station 10 as required so as to implement their operation. It will also be appreciated that the control system 60 receives information from the tire uniformity machine or other machine, via a label reader or other input device, regarding the tire to be marked, wherein the tire to be marked typically has an identifying label, such as a bar code, associated therewith which provides the necessary instructions for the size of the tire, where the tire is to be marked and what type of mark is to be applied.

Figure 3:
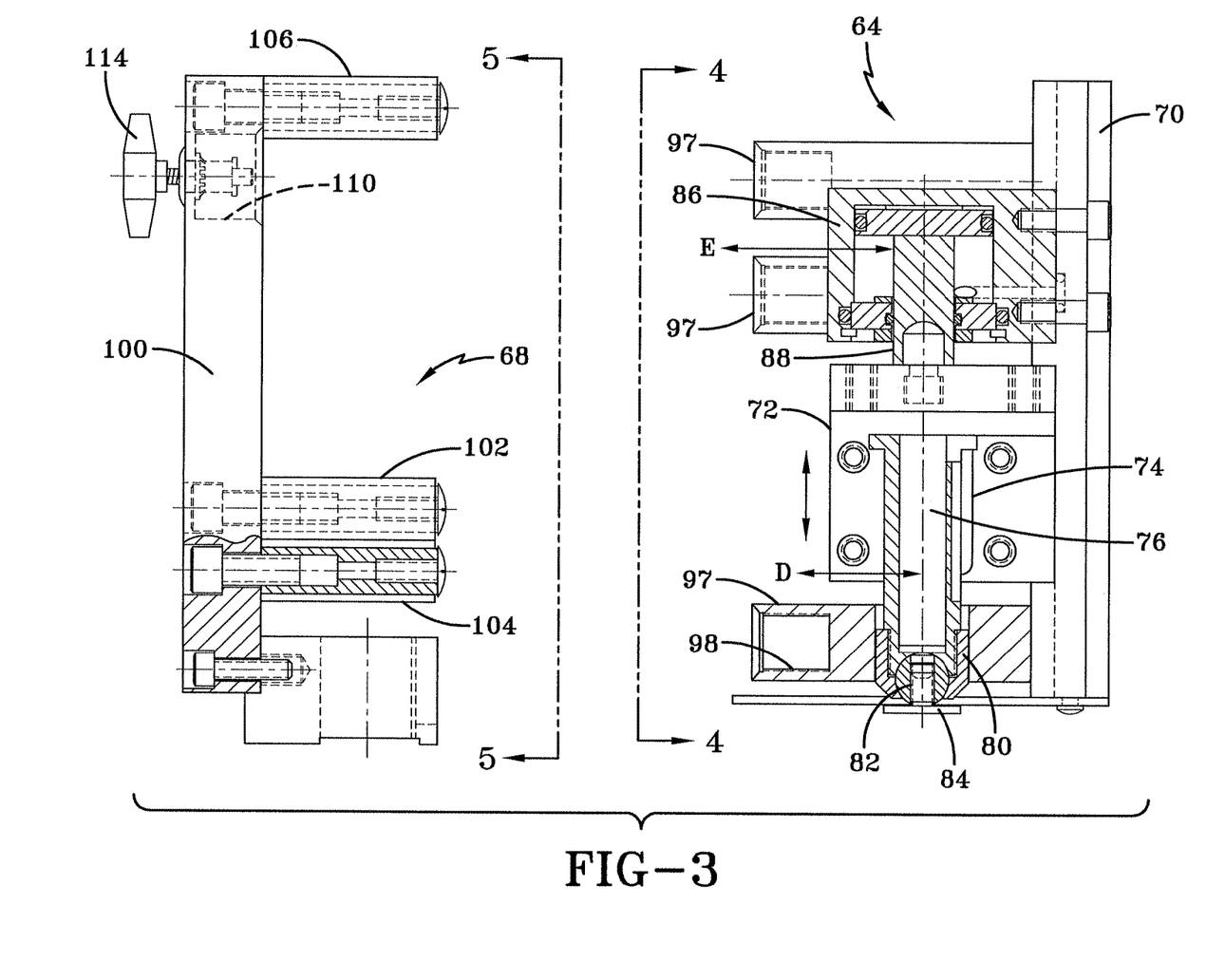
FIG. 3 is an exploded view of a marker utilized in the marking station according to the concepts of the present invention.
Figure 4:
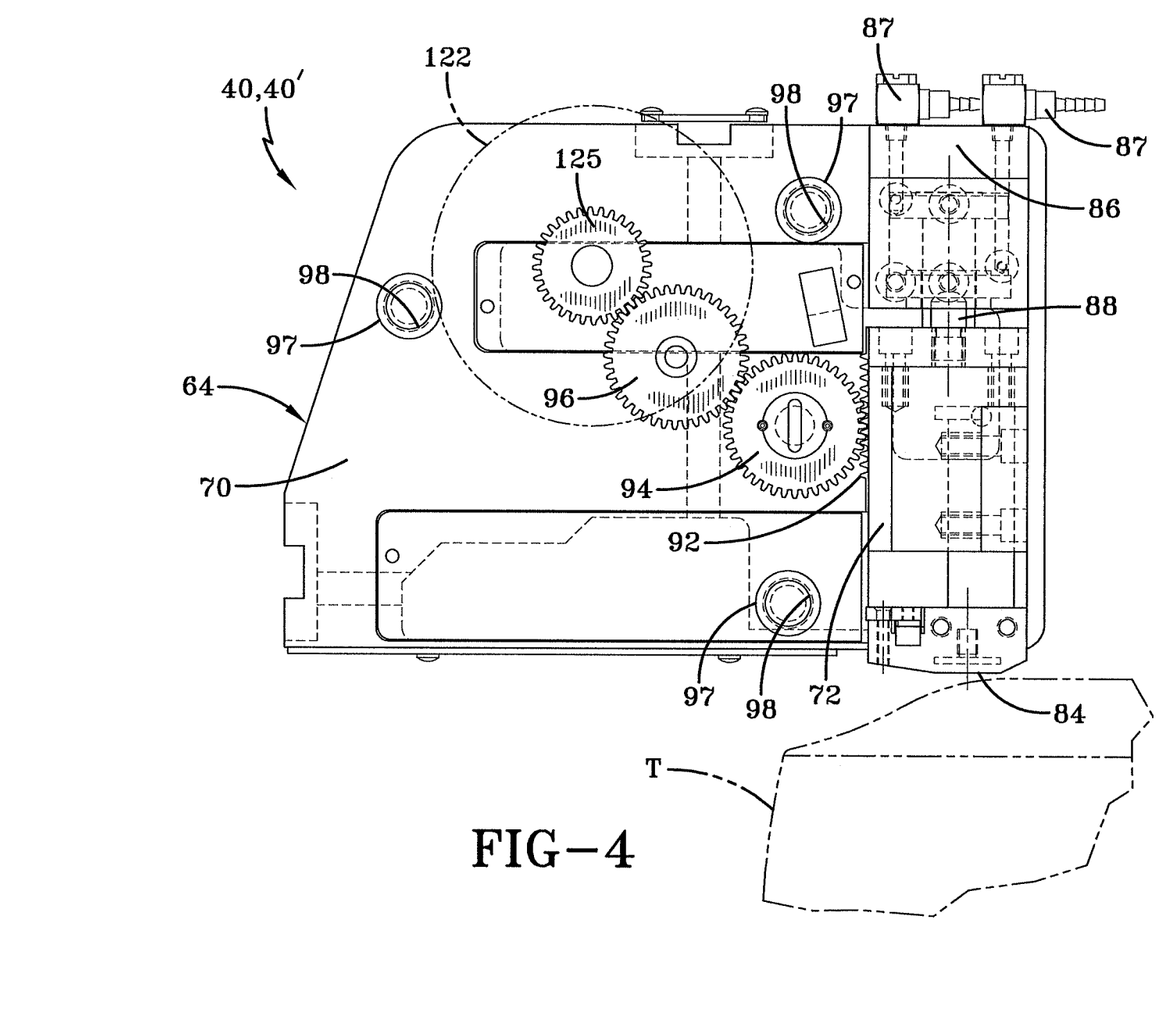
FIG. 4 is a side elevational view of a control portion of the marker according to the concepts of the present invention taken along lines 4-4 of FIG. 3.

Referring now to FIGS. 3 and 4, it can be seen that the marker 40 may include a control portion 64 that forms one side of the marker, and a tape portion 68 that forms the other side of the marker. The portions are easily assembled to one another to allow for the loading and unloading of a decal or marker tape. The control portion 64 includes a plate 70 which supports other components of the control portion. In particular, the plate 70 supports a housing 72 which contains a heater holder 74. Maintained within the heater holder 74 is a heater 76 which may be operated by the control system, via a control signal D. Associated with the heater is a ball holder 80 which maintains a swivel ball 82. Mounted to the swivel ball 82 is a marker button 84. The swivel ball 82 allows for pivotable movement of the marker button such that as the button strikes a surface to be marked, such as a tire sidewall, the swivel ball accommodates any angular difference between the marker and the surface. Also carried by the plate 70 is an air cylinder housing 86 which receives and transfers an air supply through a pair of ports 87. Operation of the cylinder 88 and the air supply coupled thereto may be controlled by the control system 60 via a control signal E. A cylinder 88 extends from the cylinder housing 86 and slidably moves the heater holder 74 and the associated marker button 84 and other associated components as needed. As a result, when the marker 40 is in position, the control system 60 sends the signal E to the air cylinder housing and the signal D to the heater 76 such that the marker button 84 comes in contact with a marker tape or decal tape, as will be discussed, and the heat and pressure are utilized to transfer a mark to the surface.

In the stamp marker 40' embodiment it will be appreciated that a linear gear 92 may be associated with the air cylinder housing 86. The linear gear 92 may engage a one-way spur gear 94 which is rotatably carried by the plate 70 and wherein the spur gear 94 rotates a secondary gear 96 as will be discussed in detail as the description proceeds.

Figure 5:
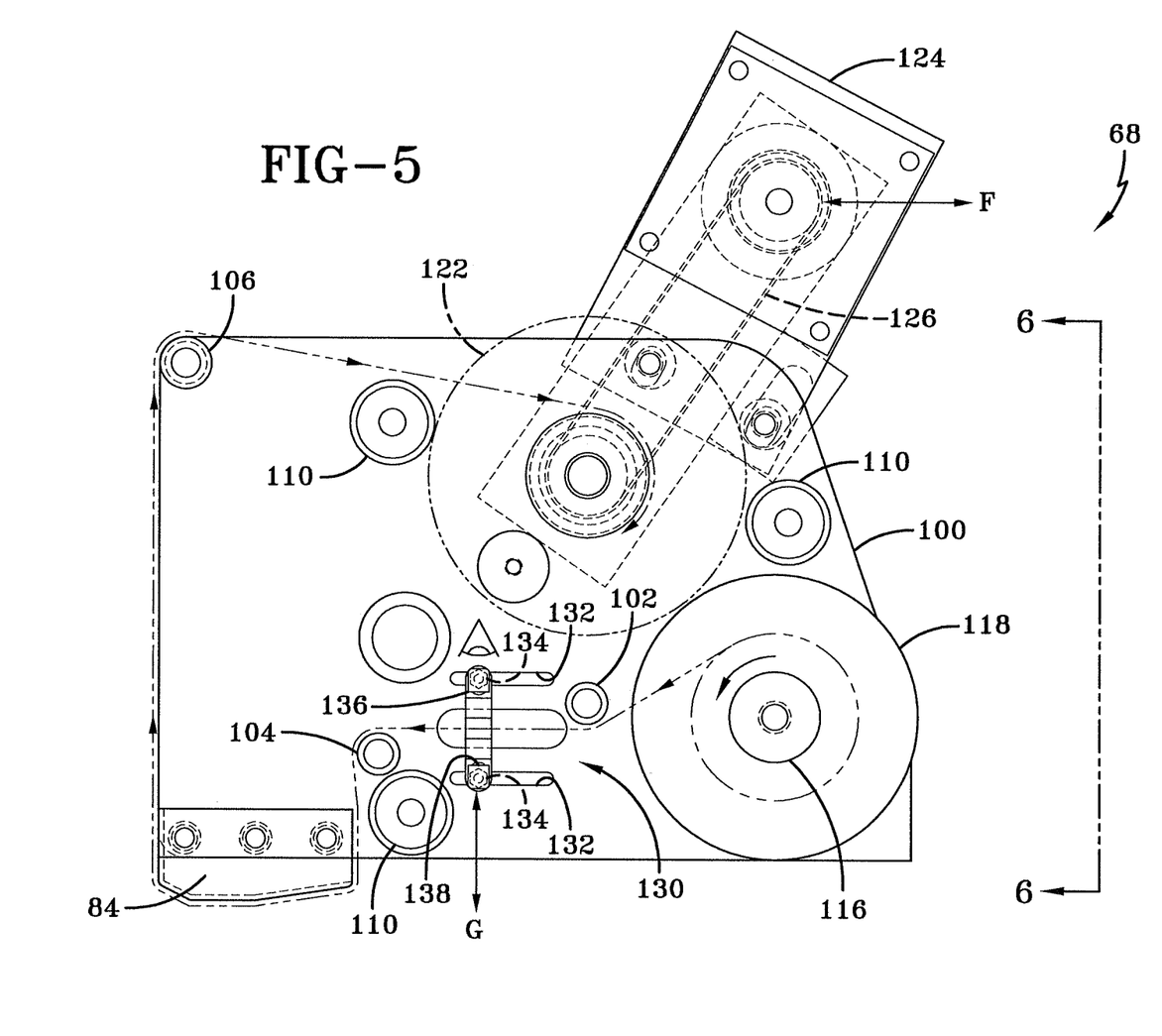
FIG. 5 is an elevational side view of a tape portion of the marker according to the concepts of the present invention taken along lines 5-5 of FIG. 3.
Figure 6:
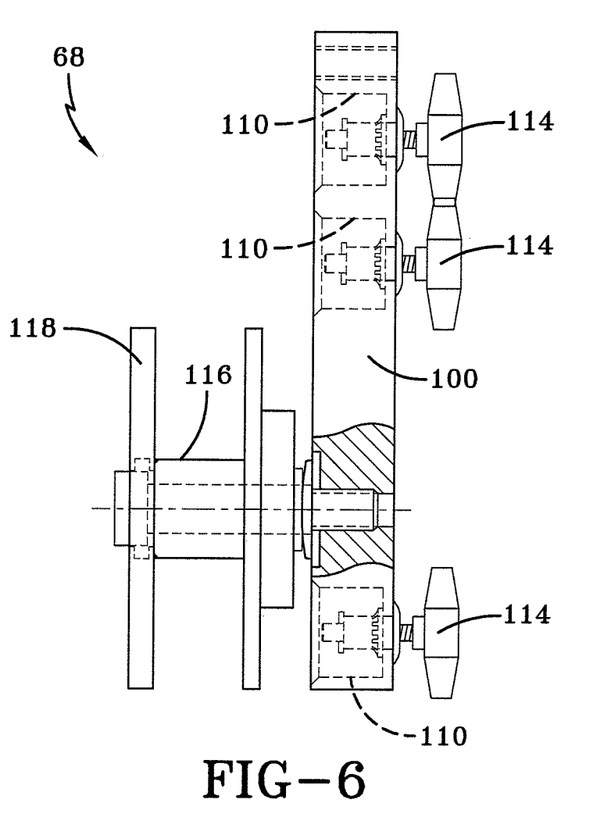
FIG. 6 is an end view of the tape portion according to the concepts of the present invention taken along lines 6-6 of FIG. 5.

Referring now to FIGS. 3, 5, and 6, it can be seen that the tape portion 68 is shown. The tape portion 68 includes a plate 100 from which substantially perpendicularly extends a tape roll capstan 102, a marker capstan 104, and a take-up capstan 106. The capstans 102-106 are rotatable and are used to assist the movement and routing of the tape as will be discussed. Extending into the plate 100 are a number of quick-connect bores 110 which receive the standoffs 97 that extend from the control portion 64. A knob connector 114 extends through the quick connect bore 110 wherein the connector is received in a standoff bore 98, which is maintained at the end of the standoff, and allows for interconnection of the tape portion and the control portion to one another.

Extending from the plate 100 is a spindle 116 which may rotatably carry a removable tape roll 118 that rotates about the spindle. A take-up roll 122, which is removable from the tape portion 68, may be connected to a motor 124 which is operatively connected to the control system 60 by a control signal F. A pulley 126 interconnects the motor 124 to the take-up roll 122. In the stamp marker 40' embodiment, the take-up roll 122 may have a roll gear 125 which is engaged and rotated by the secondary gear 96.

The plate 100 also carries a tape sensor assembly 130 wherein at least one sensor slot 132 is provided and wherein sensor fasteners 134 are utilized to secure a transmitter 136 and a receiver 138 to the plate 100. Loosening of the fasteners 134 allows for slidable position adjustment of the transmitter 136 and receiver 138 in the slot 132 as needed to accommodate characteristics of the tapes. Operation of the transmitter 136 and the receiver 138 may be controlled by the control system 60 via a control signal G.

Figure 7:
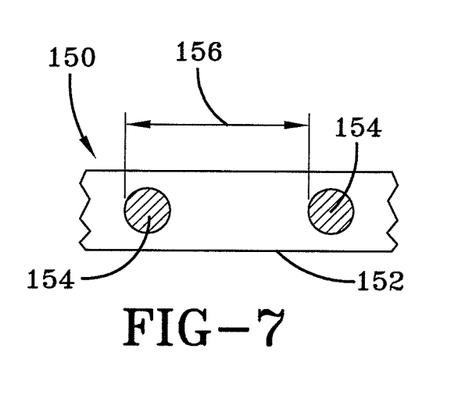
FIG. 7 is a schematic diagram of a decal tape utilized in the marker according to the concepts of the present invention.

Referring now to FIG. 7, a decal tape is designated generally by the numeral 150. The decal tape 150 includes a clear or relatively transparent membrane 152 which carries relatively non-transparent decals 154 that are separated by a predetermined distance 156. Skilled artisans will appreciate that the decal 154 may be shaped and sized substantially the same as the marker button 84. As discussed in the background art, problems occurred if the marker button and decal were not properly aligned when the button was pressed against the surface to be marked. If the button and decal are not properly aligned then the decal does not properly adhere to the surface to be marked or, in some instances, only a portion of the decal is adhered, thus leaving an incomplete marking designation which may not completely adhere to the tire surface.

Figure 8:
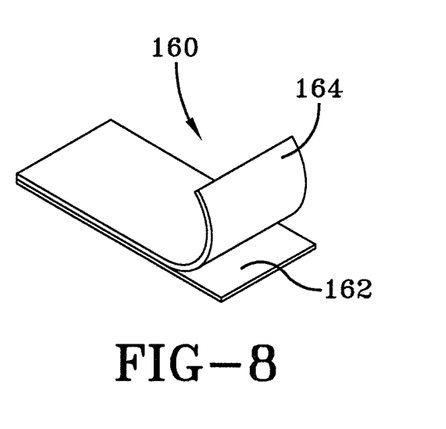
FIG. 8 is a schematic view of a marker tape utilized in the marker according to the concepts of the present invention.

Referring now to FIG. 8, it can be seen that a marker tape 160 may be employed which has a membrane 162 with a marking film 164. As discussed in U.S. Pat. No. 6,439,042, this is a standard marking tape which transfers the film upon application of heat and pressure. As such, the marker tape 160 only needs to be moved a sufficient amount to allow for the film 164 to be complete at the next marking operation. More importantly, there is no requirement for the film to be sequenced a predetermined amount, as is the case with the decal tape 150.

In operation, depending upon the type of mark the end user wants, the end user may employ either the decal tape 150 or the marker tape 160. If using the marker tape 160 the user will select a marker 40' with a control side 64 which provides for the one-way spur gear 94 and the secondary gear 96. In such an embodiment, the marker tape which is typically provided in roll form, is coupled to the tape roll 118, mounted on the spindle 116, and threaded through the capstans such that the marker tape is positioned underneath the marking button and then routed so as to be received on the take-up roll 122. After a marking operation is completed the linear gear 92 rotates the one-way spur gear 94, which in turn engages the secondary gear 96 which turns the take-up roll 122 via the roll gear 125 a distance associated with the stroke of the pneumatic cylinder 88. As such, the marker tape is then moved into position so that the next striking of the marker button will impact the membrane 162 and transfer the appropriate film 164 to the surface to be marked.

In instances where the user desires a more substantive marking of a surface, such as provided by the decal 154, the user will disassemble the marker 40 and utilize a tape portion 68 which provides for a motor 124 and the tape sensor assembly 130. In such an embodiment the spur gear of the control portion will not be employed and the secondary gear 96 will be de-coupled from the roll gear 125. As in the previous embodiment of the marker 40', the decal tape 150, which is provided on a tape roll 118, is placed on the spindle 116. The decal tape 150 is routed around the capstans as best seen in FIG. 5, and in particular so that the decal tape 150 passes between the transmitter 136 and the receiver 138. As such, the sensor assembly 130 may detect a leading or trailing edge of a decal 154 and knowing the predetermined distance 156, the control system 60 rotates the take-up roll 122 the proper amount so that the decal 154 is properly aligned with the marker button 84. Once aligned, the control system 60 instructs the cylinder 88 to actuate so that the marker button 84 and associated heat from the heater 76 and an appropriate dwell time transfer the decal 154 from the membrane 152 to the surface to be marked. Once this marking is complete, then the take-up roll is rotated the predetermined amount based upon detection of a leading or trailing edge of the next decal 154.

The advantages of the present invention are readily apparent. The sensor assembly can properly determine the positioning of the decal in relation to the marker button and move it the predetermined amount. This avoids the problem identified in the background art of relying solely on the rotation of the take-up roll to properly position the decal when the rotation of the roll does not accurately reflect the position of the decal mark in view of the expanding radius of the used membrane 152 after a period of time. The present invention is also advantageous in that minimal parts or components of the control portion and tape portion need to be swapped out between the two markers 40 and 40' which provides flexibility in the type of mark to be applied to a surface. As discussed in the background art, the marker type tape 160 is much less expensive to apply and use than the decal tape 150; however, the decal tape provides for a more substantial mark that meets certain end user's needs.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A decal marker used with a tire uniformity marking station which carries a decal tape, wherein the decal marker transfers a decal from the decal tape to a surface of the tire, comprising:
   a marking assembly frame movable between a retracted position and a marking position;
   a marker carried by said marking assembly frame, wherein said marker carries a decal tape having a membrane which carries decals; and
   a tape sensor assembly carried by said marker to detect an edge of one of the decals so that said marker properly positions the one decal for transfer to the surface.

2. The decal marker according to claim 1, said marker comprising:
   a heater; and
   a marker button coupled to said heater, said heater and said marker button carried by said marker and actuated when the decal is properly positioned.

3. The decal marker according to claim 2, further comprising:
   a spindle maintained by said marker to receive a tape roll that carries the decal tape; and
   a take-up roll maintained by said marker, said take-up roll pulling the decal tape from the tape roll and past said marker button.

4. The decal marker according to claim 3, further comprising:
   a control system connected to said tape sensor assembly; and
   a motor coupled to said take-up roll and connected to said control system, said motor rotating said take-up roll a predetermined amount so that the decal is properly positioned underneath said marker button when actuated.

5. The decal marker according to claim 3, wherein said marker has at least one plate with at least one slot which allows for slidable position adjustment of said tape sensor assembly.

6. The decal marker according to claim 5, wherein said tape sensor assembly comprises:
   a transmitter; and
   a receiver, wherein both said transmitter and said receiver are connected to said control system, wherein said transmitter and said receiver detect an edge of the decal and said control system moves said take-up roll the predetermined amount.

7. A decal marker used with a marking station which interchangeably carries a decal tape and a marking tape, wherein the decal marker transfers a decal from the decal tape to a surface to be marked, comprising:
   a marking assembly frame;
   at least one marker carried by said marking assembly frame, wherein said at least one marker carries a decal tape having a membrane which carries decals or the marking tape; and
   a tape sensor assembly carried by said at least one marker to detect an edge of one of the decals so that said at least one marker properly positions the one decal for transfer to the surface.

8. The decal marker according to claim 7, wherein said at least one marker comprises:
   a heater; and
   a marker button coupled to said heater, said marker button carried by said marker and actuated when either the decal or the marking tape is properly positioned.

9. The decal marker according to claim 8, further comprising:
   a spindle maintained by said marker to receive a tape roll that carries either the decal tape or the marking tape; and
   a take-up roll maintained by said marker, said take-up roll pulling either the decal tape or the marking tape from the tape roll and past said marker button.

10. The decal marker according to claim 9, wherein said at least one marker further comprises:
    a housing that carries said heater and said marker button, wherein said housing is linearly movable; and
    a linear gear maintained by said housing;
    wherein said at least one marker is configurable to carry a spur gear that engages said linear gear such that rotation of said spur gear rotates said take-up roll to pull the marking tape from said tape roll; and
    wherein said at least one marker is configurable to carry a motor coupled to said take-up roll, said motor rotating said take-up roll a pre-determined amount to pull the decal tape from said take-up roll so that the decal is properly positioned underneath said marker button when actuated.

11. The decal marker according to claim 10, further comprising:
    a control system connected to said tape sensor assembly;
    said motor connected to said control system and rotating said take-up roll the pre-determined amount.

12. The decal marker according to claim 11, wherein said at least one marker has at least one plate with at least one slot which allows for slidable position adjustment of said tape sensor assembly.

13. The decal marker according to claim 12, wherein said tape sensor assembly comprises:
    a transmitter; and
    a receiver, wherein both said transmitter and said receiver are connected to said control system, wherein said transmitter and said receiver detect an edge of the decal and said control system moves said take-up roll the predetermined amount.

14. The decal marker according to claim 1, further comprising:
    a take-up roll maintained by said marker to pull the decal tape from a tape roll; and
    said tape sensor assembly controlling an amount of said take-up roll rotation based on detection of the edge of one of the decals.

15. The decal marker according to claim 7, further comprising:
    a take-up roll maintained by said marker to pull the decal tape from a tape roll; and
    said tape sensor assembly controlling an amount of said take-up roll rotation based on detection of the edge of one of the decals.

* * * * *